US008065314B2

(12) United States Patent
Prakash et al.

(10) Patent No.: US 8,065,314 B2
(45) Date of Patent: *Nov. 22, 2011

(54) METHOD FOR MATCHING COLOR AND APPEARANCE OF A COATING CONTAINING EFFECT PIGMENTS

(75) Inventors: Arun Prakash, West Chester, PA (US); Allan Blase Joseph Rodrigues, Bloomfield Hills, MI (US); Judith Elaine Obetz, Newtown Square, PA (US); Wilhelm Kettler, Wuppertal (DE); John Paul Gallagher, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/906,208

(22) Filed: Oct. 1, 2007

(65) Prior Publication Data

US 2009/0019086 A1    Jan. 15, 2009

Related U.S. Application Data

(60) Provisional application No. 60/848,757, filed on Oct. 2, 2006.

(51) Int. Cl.
*G06F 17/30* (2006.01)
*G06F 7/00* (2006.01)
*G09G 5/02* (2006.01)
*G01N 31/00* (2006.01)
*G01J 3/46* (2006.01)

(52) U.S. Cl. ............ 707/758; 702/32; 345/589; 356/402
(58) Field of Classification Search ................. 707/758; 702/32; 345/589; 356/402
See application file for complete search history.

(56) References Cited

U.S. PATENT DOCUMENTS

| 5,668,633 | A | 9/1997 | Cheetam et al. |
| 6,952,265 | B2 | 10/2005 | Prakash et al. |
| 6,959,111 | B2 | 10/2005 | Hirayama et al. |
| 2001/0036309 | A1 | 11/2001 | Hirayama et al. |
| 2004/0252308 | A1* | 12/2004 | Prakash et al. ................ 356/445 |
| 2005/0128484 | A1* | 6/2005 | Rodrigues et al. ............ 356/402 |
| 2006/0181707 | A1 | 8/2006 | Gibson et al. |
| 2007/0032965 | A1* | 2/2007 | McClanahan et al. ........... 702/32 |
| 2007/0035554 | A1* | 2/2007 | McClanahan .................. 345/589 |

FOREIGN PATENT DOCUMENTS

| EP | 1139234 A1 | 10/2001 |
| WO | 2006/030028 A1 | 3/2006 |

* cited by examiner

*Primary Examiner* — Kimberly Lovel
(74) *Attorney, Agent, or Firm* — Gann G. Xu

(57) ABSTRACT

The present invention is directed to a method for identifying one or more matching formulas for matching color and appearance of a target coating containing effect pigments. The present invention is also directed to a system for identifying one or more matching formulas for matching color and appearance of a target coating containing effect pigments.

45 Claims, No Drawings

METHOD FOR MATCHING COLOR AND APPEARANCE OF A COATING CONTAINING EFFECT PIGMENTS

CROSS-REFERENCE TO RELATED APPLICATION

This application claims priority under 35 U.S.C. §119 from U.S. Provisional Application Ser. No. 60/848,757 (filed Oct. 2, 2006), the disclosure of which is incorporated by reference herein for all purposes as if fully set forth.

FIELD OF INVENTION

The present invention is directed to a method for identifying one or more matching formulas for matching color and appearance of a target coating containing effect pigments. The present invention is also directed to a system for identifying one or more matching formulas for matching color and appearance of a target coating containing effect pigments.

BACKGROUND OF INVENTION

Surface coatings containing effect pigments, such as light absorbing pigment, light scattering pigments, light interference pigments, and light reflecting pigments are well known. Metallic flake pigments, for example aluminum flakes, are examples of such effect pigments and are especially favored for the protection and decoration of automobile bodies, such as for example by reason of their imparting a differential light reflection effect, usually referred, to as "flop", as well as flake appearance effects, which include flake size distribution and the sparkle imparted by the flake as well as the enhancement of depth perception in the coating. The flop effect is dependent upon the angle from which the car body is viewed. The degree of the flop effect achieved, is a function of the orientation of the metallic flakes with respect to the outer surface of the coating. The degree of sparkle is a function of the flake size, surface smoothness, orientation, and uniformity of the edges. Metallic coatings usually also contain pigments, generally of a light absorbing rather than a light scattering type. Any light scatter from the pigments or the flakes themselves, e.g., from the flake edges, diminishes both the flop and the sparkle of the coating.

For repairing a previously coated substrate, for example, of an automotive body, it is necessary to choose the correct pigments to match the color of that substrate as well as the correct effect pigments such as flakes to match the color and appearance of that substrate. Many coating formulas are made available by paint suppliers to match various vehicles and objects to be coated. Often there are multiple coating formulas available for the same vehicle make and model because of vehicle coating color and appearance variability due to slight variations in formulations, ingredients used, coating application conditions such as coating application techniques or locations used by vehicle original equipment manufacturers. These color and appearance variations make it difficult to identify the best formula to attain excellent matches in autobody shops. A number of methods have been developed to identify formulas of correct pigments to achieve color match. For example, U.S. Pat. No. 5,668,633 disclosed a computer implemented method for identifying one or more color formulas matching the color of a standard by using color spectrum readings. European patent application EP 1139234, filed on Feb. 12, 2001, disclosed a method to identify one or more color matching formulas to match color of a vehicle using a vehicle identification number (VIN) and a color code of that vehicle.

Some attempts were made to match both color and appearance of a target coating. U.S. Pat. No. 6,952,265, disclosed a method to obtain appearance data of a target coating in digital images and to compare the appearance data to appearance characteristics stored in a coating database. However, it lacks the ability to correlate color data and cannot identify formula for matching both color and appearance. WO 2006/030028, filed on Sep. 16, 2005 with an international application No. PCT/EP2005/054627, disclosed a method using color and texture properties of paint modules to formulate a coating for matching both color and appearance. However, it considers each of the properties individually and lacks capability to consider complex relations among each of the properties when mixed in a coating. A U.S. Pat. No. 6,959,111, disclosed a method for matching color of a target coating by obtaining color data in L*,a*,b* values by using a calorimeter, and quantitative particle feeling data by using a CCD camera. However, it requires the production of multiple test panels coated with a plurality of candidate coatings and repeated measurements of color and particle feeling data of the test panels to select best match on color and appearance.

It is therefore still in need for a method and a system for automatic measurement of appearance of a target coating and for the selection, from multiple existing coating formulas, of one or more matching formulas that closely match both the color and appearance of the target coating.

STATEMENT OF INVENTION

This invention is directed to a method for identifying one or more matching formulas for matching color and appearance of a target coating containing effect pigments, said method comprising the steps of:
   a) obtaining color data of the target coating;
   b) obtaining appearance data of the target coating;
   c) comparing the color data and the appearance data to color characteristics and appearance characteristics stored in a coating database; and
   d) selecting from the coating database, one or more said matching formulas, wherein said matching formulas have color characteristics that match the color data and appearance characteristics that match the appearance data.

This invention is also directed to a method for identifying one or more matching formulas for matching color and appearance of a target coating containing effect pigments, said method comprising the steps of:
   a) obtaining color data of the target coating using a color measurement device;
   b) obtaining one or more target images of the target coating at one or more pre-set illumination intensities using an imaging device;
   c) measuring characteristics of said target coating from said target images to generate appearance data;
   d) comparing the color data and the appearance data to color characteristics and appearance characteristics stored in a coating database; and
   e) selecting from the coating database, one or more said matching formulas, wherein said matching formulas have color characteristics that match the color data and appearance characteristics that match the appearance data.

This invention is further directed to a system for identifying one or more matching formulas for matching color and appearance of a target coating containing effect pigments, said system comprising:
 a) a color measurement device for obtaining color data of the target coating;
 b) an appearance measurement device for obtaining appearance data of the target coating;
 c) a computing device comprising a processor and a memory member;
 d) a coating database containing coating formulas associated with color characteristics and appearance characteristics, wherein the coating database is accessible from the computing device; and
 e) a computing program product operatively residing in the memory member that causes the computing device to perform a computing process comprising the steps of:
  i) receiving the color data and the appearance data of said target coating;
  ii) comparing said color data and said appearance data to color characteristics and appearance characteristics stored in the coating database; and
  iii) selecting from the coating database, one or more said matching formulas, wherein said matching formulas have color characteristics that match the color data and appearance characteristics that match the appearance data.

This invention is even further directed to a system for identifying one or more matching formulas for matching color and appearance of a target coating containing effect pigments, said system comprising:
 a) a color measurement device for obtaining color data of the target coating;
 b) an imaging device for obtaining target images of the target coating at said pre-set illumination intensities;
 c) an illumination device to provide illuminations at one or more pre-set illumination intensities to the target coating and to direct a reflection of said illuminations to the imaging device;
 d) a computing device comprising a processor and a memory member;
 e) a coating database containing coating formulas associated with color characteristics and appearance characteristics, wherein the coating database is accessible from the computing device; and
 f) a computing program product operatively residing in the memory member that causes the computing device to perform a computing process comprising the steps of:
  i) receiving the color data and the target images of said target coating;
  ii) measuring characteristics of said target coating from said target images to generate appearance data;
  iii) comparing said color data and said appearance data to color characteristics and appearance characteristics stored in the coating database; and
  iv) selecting from the coating database, one or more said matching formulas, wherein said matching formulas have color characteristics that match the color data and appearance characteristics that match the appearance data.

DETAILED DESCRIPTION OF PREFERRED EMBODIMENT

The aspects and advantages of the present invention will be more readily understood, by those of ordinary skill in the art, from reading the following detailed description. It is to be appreciated that certain aspects of the invention, which are, for clarity, described above and below in the context of separate embodiments, may also be provided in combination in a single embodiment. Conversely, various aspects of the invention that are, for brevity, described in the context of a single embodiment, may also be provided separately or in any subcombination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment also includes metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, or other visual effects of a coating, especially when viewed from varying viewing angles and/or with varying illumination angles.

Gonioapparent flakes refer to flakes pertaining to change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

The term "database" refers to a collection of related information that can be searched and retrieved. The database can be a searchable electronic numerical, alphanumerical or textual document, a searchable PDF document, an Microsoft Excel® spreadsheet, an Microsoft Access® database (both supplied by Microsoft Corporation of Redmond, Wash.), an Oracle® database (supplied by Oracle Corporation of Redwood Shores, Calif.), or a Lynux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a subunit of another device. Examples of such subunit can be a processing chip in an imaging device, a spectrophotometer, or a goniospectrophotometer. A computing device may be connected to a display device, such as a monitor screen. However, the display device is not necessary. A "portable computing device" includes a laptop computer, a pocket PC, a personal digital assistant (PDA), a handheld electronic processing device, a mobile phone, a smart phone that combines the functionality of a PDA and a mobile phone, a tablet computer, or any other stand alone or subunit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, local area network (LAN) device, infrared communication device, optical data transfer device, radio transmitter and optionally receiver, wireless phone, wireless phone adaptor card, or any other devices that can transmit signals in a wide range of electromagnetic wavelengths including radio frequency, visible or invisible wavelengths.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device captures images in digital signals. Examples of the digital imager include, but not limited to, a digital still camera, a digital video camera, a digital scanner, and a charge couple device (CCD) camera. An imaging device can capture images in black and white, gray scale, or various color levels. A digital imager is preferred in this invention. Images captured using a non-digital imaging device, such as a still photograph, can be converted into digital images using a digital scanner and can be also suitable for this invention.

An illumination device for providing illuminations typically includes a light source, such as, the IT3900 with a tungsten-halogen lamp EKE supplied by Illumination Technologies Inc., East Syracuse, N.Y. and a fiber optic bundle A08025.60 supplied by Schott Fostec Inc., Auburn, N.Y. that is capable of producing beams of illumination in the visible light range of from 400 nanometers to 700 nanometers at set intensities. The system, which is preferably portable, is preferably provided with an enclosed extension to house the light source. However, applicants also contemplate using alternative means, such as the MHF-C50LR light source with an LM-50 lamp and a fiber optic bundle connected to a MML4-45D micro machine lens system, supplied by Moritex USA Inc., San Jose, Calif. to pipe-in the illumination beams from the light source. The means for selecting an effective illumination intensity can be any conventional means, such as a voltage regulator that can change the current to the filament of the light source. The illumination intensity can be controlled in accordance with a conventional software program run from a computer to achieve the preset intensities. The computer used here to control the illumination intensity can be the same aforementioned computing device for receiving the image or a separate computer or a separate computer. Any suitable computer can be used, such as, for example, Dell Precision M50 model supplied by Dell Computer Corp., Round Rock, Tex. If desired, the system may comprise additional means such as a collimating lens or an aperture, for collimating the one or more beams of light emanating from light source as determined necessary by those skilled in the art.

This invention is directed to a method for identifying one or more matching formulas for matching both color and appearance of a target coating containing effect pigments.

Color data can be obtained by measuring reflectances of a target coating using a color measurement device, such as a colorimeter, a spectrophotometer, or a goniospectrophotometer. Any suitable colorimeter or spectrophotometer, such as Model SP64 manufactured by X-Rite, Grandville, Mich. can be used. Portable spectrophotometers are preferred as they can be readily positioned over coated substrate surfaces of various shapes and sizes. If desired one can measure the reflectances over several portions of the target coating to average out the reflectances of the target coating. Spectral reflectance data can be obtained using spectrophotometer. In a typical spectrophotometer, a light beam of known intensity can be directed towards the target coating and reflectance from the target coating is sequentially measured at least one, preferably at three, aspecular angles at preset wavelengths. Alternatively, a light beam of known intensity can be sequentially directed at least one, preferably at three, incident angles towards the target coating and reflectance from the target coating is then measured at preset wavelengths with a single detecting device so as to provide measurements at different aspecular angles, depending on the angle of illumination. A goniospectrophotometer is a spectrophotometer having the capability of measuring with a variety of illuminating and viewing angles using bidirectional geometry. A goniospectrophotometer is also known as multi-angle spectrophotometer. Any suitable Goniospectrophotometers, such as Model MA6811 from X-Rite, Grandville, Mich., or the ones provided by Murakami Color Research Laboratory, Tokyo, Japan, or by IsoColor Inc., Carlstadt, N.J., USA, can be used. Gonioapparent colors should be measured at multiple angles, preferably 3 to 5. For solid colors, a single aspecular angle is sufficient, typically 45 degrees. A common practice for solid colors is to illuminate at a single angle and measure the diffuse reflectance using an integrating sphere, capturing the light reflected at all angles from the target coating. The reverse method of illuminating diffusely and measuring at a single angle yields equivalent results. Diffuse reflectance is preferred when the target coating has a textured surface.

Typically measurements are taken at 10 nm wavelength intervals from 400 nm to 700 nm wavelengths. A plot of the percent reflectance as a function of wavelength is referred to as a "spectral curve" or spectral reflectance data. For a solid color (non-flake or non-gonioapparent color, such as that lacking metallic flakes), only one spectral curve is typically sufficient to measure solid color properties. Other common geometries of measurement are diffuse illumination with 0° or 8° viewing or the reverse. If a target coating having flakes, i.e., gonioapparent color was being matched, reflectance measurements at additional angles would be necessary. ASTM E-2194 recommends three angles, 150, 450, and 110° as measured away from the specular reflection. DIN 6175-2 recommends up to five angles, all within this same range of angles. The X-Rite MA6811 can provide measurements at 15°, 25°, 45°, 75°, and 110°. The measurement data or spectral reflectance data can be converted into L*,a*,b* or L,C,h values as described in detail in aforementioned U.S. Patent publication No. 2006/0181707, herein incorporated by reference.

Color data may include spectral characteristics such as chroma, hue, lightness, darkness, and the like. Color data may further include a color code of a vehicle, a vehicle identification number (VIN) of a vehicle, a part of the VIN, or a combination thereof.

Appearance data can be generated using methods described below. In one embodiment, the appearance data can be obtained by capturing one or more target images using an imaging device and subsequent measurement of the target images using a computing device. The target images can be still images or video images. Both still images and video images are suitable for this invention. The target images, either still or video images can be stored in digital formats for measurement of appearance characteristics at same time or at a later time. The target images can also be captured and transmitted to a computing device for measurement of appearance without being stored permanently, such as real-time video images without being stored. In this invention, stored images are preferred, and stored still images are further preferred. In another embodiment, appearance data are generated by an appearance measurement device and stored as non-image electronic files. Examples of such non-image electronic files include, but not limited to, numerical, textual or alphanumerical data files correlating positions and reflectance intensity at each of the positions. Image and non-image data files can be converted to each other according to well known methods. For example, an image can be measured using methods described below and stored into a separate appearance data files.

Appearance data can comprise one or more appearance characteristics selected from features, feature values, values calculated or derived from the feature values, or a combination thereof. A feature is a characteristic or attribute that contributes to the visual appearance of a coating. A feature can be identified and localized such as a sparkle object, a flake or a flake-like object, a physical distance between two adjacent objects, a region where one or more objects reside, a region having multiple objects, or a combination thereof. A feature can also be characteristic or attribute such as distribution of intensities, variation of intensities, or other statistical descriptions of the coating appearance. For example, a feature can be a flake or a flake-like object visible from the target images. Those skilled in the art can determine a set of considerations under which decisions can be made whether a characteristic or attribute of a coating is to be included as a feature for appearance measurement and how a feature value can be generated. These considerations and decisions can be integrated into a computer program product to automatically measure appearance of a coating. Examples of these considerations and decisions are provided by one or more embodiments described below.

In one embodiment, one or more images of the target coating containing flakes are captured with a method comprising the steps of:
 i) providing illuminations to the target coating at a fixed illumination angle and at varying illumination intensities;
 ii) selecting an effective illumination of an effective intensity under which flakes of the target coating exhibit varying brightness;
 iii) directing a reflection of said effective illumination from the target coating to the imaging device to capture at least one image of the target coating.

The images captured in this embodiment can be measured to generate appearance data using a method determined appropriate by those who are skilled in the art. One example of such method to measure the images in this embodiment can comprise the steps of: i) scanning the target image at a first threshold level and at subsequent threshold levels to identify a set of bright areas of said image where the flakes exhibit highest brightness, a set of intermediate areas where the flakes exhibit intermediate brightness, and a set of dark areas essentially free of visible flakes; and ii) extracting features of the bright areas, the intermediate areas, and the dark areas. Feature values extracted from said areas include the number, sizes and fractional areas of distinct flakes or flake-like objects at different preset threshold levels. It is understood that the coating database in this embodiment need to have comparable appearance characteristics, preferably generated by the same, similar or compatible methods, so corresponding differences among features (herein referred to as feature distances) can be calculated appropriately.

In another embodiment, target images can be captured using a method described in detail in the U.S. Pat. No. 6,952,265, herein incorporated by reference. First, one or more beams of illumination at a preset intensity is directed towards the target coating. The beams can be directed at a perpendicular (0°), also known as normal (0°) angle to the surface of target coating, or an angle within the range from −5° to +5° from the normal. Preferably, one or more beams of illumination are directed sequentially at plurality of preset intensities, preferably at least two, and more preferably at least three preset intensities. Then, a reflection of the target coating is directed to an imaging device to capture a target image in color or preferably in gray scale, of the target coating. Preferably, one or more reflections of the target coating are directed sequentially at plurality of other preset intensities to the imaging device.

The target images of this embodiment can be transmitted to a computing device, such as a computer, or a portable computer. Appearance data of the target coating is generated by the computing device by measuring appearance characteristics from the images. One measurement method suitable for generating said appearance data is described in U.S. Pat. No. 6,952,265 with the following steps:
 (a) scanning the target images at first of the preset intensities and at first of threshold levels;
 (b) locating regions of pixels recognizable above the first threshold level in the target images at the first of the preset intensities;
 (c) scanning the target images at the first of the preset intensities and at subsequent said threshold level;
 (d) locating new regions of pixels recognizable above the subsequent threshold level in the target images at the first of preset intensities;

(e) locating coincident regions of pixels recognizable above the subsequent threshold level that incorporate the regions of pixels recognizable above the first threshold level located in said step (b);

(f) adding number of the new and coincident regions of pixels of preset sizes located in said steps (d) and (e) to record a final number of the preset sizes of regions of pixels recognizable above the threshold levels at the first of preset intensities. A feature in this embodiment can be a characteristic or attribute, such as a flake or a flake-like object visible at one or more threshold levels, a physical distance between two adjacent objects, or a region having multiple objects. The final number of the pre-set sizes is referred to as a feature value; and (g) repeating said steps (a), (b), (c), (d), (e), and (f) at subsequent preset intensities.

In the foregoing method steps (a) through (g), several decisions are made on the basis of preset criteria. In step (a), when the target image at first of the preset intensities and at first of threshold levels is scanned, i.e., at the highest threshold level, only regions of pixels representing flakes having most prominent visible features would be located. The location and size, in accordance with the preset criteria of sizes, such a region is recorded as a new flake. When the same target image is scanned in step (c) at subsequent threshold level, it is possible that new regions of pixels could become recognizable above the subsequent threshold level in the target image at the first of preset intensities. Thus, a previously located region recorded as new flake may appear larger once its additional features are located at lower threshold level. The foregoing coincident regions include single contiguous regions of pixels recognizable above the first threshold level that are enveloped within single regions of pixels recognizable above said subsequent threshold level. Under such a scenario the previously located and recorded size of the flake is discarded and the new larger size is recorded in its place.

Alternatively, the foregoing coincident regions can also include plurality of regions of pixels recognizable above the first threshold level that are merged within regions of pixels recognizable above the subsequent threshold level. Thus, a cluster of small regions, which were previously located and recorded as new flakes of small size, when analyzed at a lower threshold level can be part of a larger flake. Under such a scenario, the previously located and recorded size of these small regions is discarded and a new larger region is located and recorded in their place. In addition, in another scenario, at a higher threshold level, a larger region could be located adjacent to a smaller region, both of which would be located and recorded. However, the same combination, when viewed at a lower threshold level can become part of a larger region. Under such a scenario, the previously located and recorded sizes of these smaller/larger regions are kept and larger region is discarded, since larger region is likely to be a result of multiple flakes appearing as one merged flake, which should not, therefore, be counted as one large flake but should be counted as two distinct regions, namely larger region and smaller region. In addition to the foregoing, it is possible that a region not recorded at all at higher threshold could appear at lower threshold, which would also be located and recoded at that threshold level. Moreover, it would be apparent that any regions having no changes to their size even at lower threshold levels would be also located and recorded without change. The same process is repeated at other preset intensities.

By locating and recording the number of flakes from the target images at higher and lower thresholds and multiple illumination levels, said measurement method generates appearance data including a plurality of target features and corresponding target feature values that reflect sizes of the flakes in the target coating at pre-set illumination intensities. Although a target coating having flakes as effect pigments are specifically described, the above mentioned method is also suitable for coatings containing other effect pigments.

Appearance characteristics of a number of known flakes of alternate coatings associated with one or more coating formulas are stored in a coating database. Each individual appearance characteristic of an alternate coating includes a plurality of alternate features and corresponding alternate feature values associated with the size, amount, and type of flakes that are incorporated in said coating formula to provide said individual appearance characteristic. Individual alternate coating is prepared by coating an alternate panel with an alternate coating composition having the known flakes and known binders including polymers, pigments, solvents, additives and other ingredients necessary to form a coating as determined by those who skilled in the art. Appearance characteristics of alternate coatings are generated with the same or compatible with the aforementioned imaging and measurement methods. Data on the appearance characteristics of alternate coatings can be stored image or non-image data files, or a combination thereof. An advantage of storing images of the alternate coatings is that when different threshold levels are used for measuring appearance characteristics of the target coating, the stored alternate coating images can be measured using the same threshold levels without the need to capture new alternate images.

In yet another embodiment, one or more images of the target coating are captured with a method comprising the steps of:
  i) sequentially providing directional illuminations to the target coating at two or more illumination angles and at one or more preset intensities;
  ii) directing a reflection of each of said illuminations from said target coating to an imaging device to sequentially capture one or more target images of said target coating.

In yet another embodiment, one or more images of the target coating are captured with a method comprising the steps of:
  i) sequentially providing diffused illuminations to the target coating at one or more preset intensities;
  ii) directing a reflection of each of said illuminations from said target coating to an imaging device to sequentially capture one or more target images of said target coating.

In yet another embodiment, one or more images of the target coating are captured with a method comprising the steps of:
  i) sequentially providing a combination of directional and diffused illuminations to the target coating at one or more illumination angles and at one or more preset intensities;
  ii) directing a reflection of each of said illuminations from said target coating to an imaging device to sequentially capture one or more target images of said target coating.

The images captured in these embodiments can be measured to generate appearance data using a method determined appropriate by those who are skilled in the art. One example of such method to measure the images in this embodiment can comprise extracting features and feature values at each said illumination angles or intensities. It is understood that the coating database in this embodiment need to have comparable appearance characteristics, preferably generated by the same, similar or compatible methods, so corresponding feature distances can be calculated.

In yet another embodiment, appearance data can be generated without capturing target images. It can be done by detecting the reflectance of the target coating and directly recording in a non-image data file such as a set binary data files, or other non-image data files that can record appearance information. Any aforementioned digital imaging devices can be configured directly or through a converter to generate non-image data file, such as a binary data file. An image recorded by an analog imaging device such as a photograph captured by a still film camera, can be converted into a digital image, or a non-image data file by, for example, a scanner.

Color data or appearance data of a target coating can be obtained at a same portion or at different portions of the target coating. Different portions of the target coating include different portions from a same piece of a substrate coated with the target coating and from different pieces of substrates coated with the same target coating. For example, color data or appearance data can be obtained from different vehicles of the same model, same manufacturing year, and coated with the same coating. In another example, color data or appearance data can be obtained from different target panels coated with the same target coating.

Color data, such as the L,a,b, or L*,a*,b* or L,C,h values of the target coating can be entered into a computing device and compared with color characteristics, such as L,a,b, or L*,a*, b* or L,C,h values of coatings stored in a coating database. Individual aspects of color differences between the target coating and the coatings in the coating database, herein referred to as $\Delta L$, $\Delta a$, $\Delta b$, or $\Delta L^*$, $\Delta a^*$, $\Delta b^*$, or $\Delta L$, $\Delta C$, $\Delta H$ can be determined by using equations described in aforementioned U.S. Patent publication No. 2006/0181707, wherein $\Delta L$, $\Delta a$, $\Delta b$, or $\Delta L^*$, $\Delta a^*$, $\Delta b^*$ or $\Delta L$, $\Delta C$, $\Delta H$ designate differences between the L,a,b, or L*, a*, b*, or L, C, h color values of the target coating and of the coatings stored in the coating database, respectively. A total color difference $\Delta E$ or $\Delta E^*$ can be calculated using the following equations.

$$\Delta E = \sqrt{\Delta L^2 + \Delta a^2 + \Delta b^2}$$

$$\Delta E^* = \sqrt{\Delta L^{*2} + \Delta a^{*2} + \Delta b^{*2}}$$

Alternatively, $\Delta E$ or $\Delta E^*$ can also be calculated from $\Delta L$, $\Delta C$, $\Delta H$ using the equation described in aforementioned U.S. Patent publication No. 2006/0181707.

Several color difference equations are published in the literature. The International Committee on Illumination (CIE) in 1994 recommended Color Difference Equations now referred to as the "CIE94 Equations". Another commonly used formula is the "CMC Equations". These are both shown in aforementioned U.S. Patent publication No. 2006/0181707. These equations provide a mathematical estimate of accuracy of color match that would be observed by a normal observer under a given lighting condition, typically using the D65 illuminant, representing average daylight. A more recent CIE recommendation for study is the CIEDE2000 Equation (Publication CIE 142-2001, ISBN 3 901 906 08 8, CIE, Vienna, Austria, 2001). For gonioapparent colors these should be calculated at multiple angles (preferably 3-5) and combined by weighting the $\Delta E$ or $\Delta E^*$ at each angle. Alternatively they can be combined by weighting the individual $\Delta L$, $\Delta C$, $\Delta H$ components for each angle. An example of this is shown by Saris, H. J. A. et al. (Color Res. Appl, 15, 200-205, 1990). They suggested in that publication optimized weights for each component at each angle using the CMC equations.

When values of $\Delta E$ or $\Delta E^*$ are less than a certain preset value, it is generally accepted that the color difference is not significant. That means when the total color difference $\Delta E$ or $\Delta E^*$ between the target coating and a coating prepared based on a stored formula is less than said preset value, the coating prepared based on the stored formula can generally provide a match, or blendable match with the target coating. The preset value can be determined by those skilled in the art depending on specific needs. For example, when a mirror casing of a car is to be coated with a repair coating matching color and appearance of the rest of coatings of the car, preset values of $\Delta E$ or $\Delta E^*$ can be slightly higher since color and appearance differences between the mirror casing and the rest of coatings of the car may be less noticeable. However, when an area of a door panel of a car is to be coated with a repair coating, preset values of $\Delta E$ or $\Delta E^*$ may be much lower since color and appearance differences between the repaired area and the rest of the door panel are highly noticeable.

Other alternatives described in U.S. Patent publication No. 2006/0181707 can also be used to compare color data of the target coating with the stored color characteristics. The total color differences between the color data and the stored color characteristics are ranked.

The appearance data can be compared to each individual appearance characteristic stored in the coating database by calculating differences between individual target feature values and individual alternate feature values, herein referred to as "feature distances". A simple sum, a root mean square of sum, a weighted aggregated sum, or other calculated sum of feature distances can then be generated. One example of such calculated sum is root mean square (RMS) of sums as well known to those skilled in the art. It is well understood by those skilled in the art that different weighing factor(s) can be given to each feature, feature value or feature distance to produce optimized color and/or appearance match. Calculation considerations, weighing factors and algorithms are described in detail in aforementioned U.S. Pat. No. 6,952,265, herein incorporated by reference. Results of the comparisons are ranked based on selected sum of feature distances.

One or more matching formulas can be selected from the coating database, wherein said matching formulas have color characteristics matching the color data and appearance characteristics matching the appearance data. Generally, all coating formulas having $\Delta E$ less than 2 are selected and then the sum of feature distances are considered. The coating formulas with $\Delta E$ less than 2 and having smallest sum of feature distances are selected as the matching formulas.

Color data of the target coating can be obtained from a color code, a vehicle identification number (VIN) of a vehicle, a part of the VIN, or a combination thereof. Many paint suppliers, especially vehicle refinish paint suppliers, often produce matching coatings that match an original coating of a vehicle (OEM coating) and the matching coatings are usually associated with a color code of the OEM coating, a vehicle identification number or a part of the VIN of the vehicle. Methods for matching coating color of a vehicle based on color code or a VIN are well known. One example of using a VIN and a color code to match color of a target coating was disclosed in aforementioned European patent application EP 1139234. When a color code, or a VIN or a combination of a color code and a VIN is used, a number of coating formulas can be retrieved from a coating database that have coating formulas associated with the color code, the VIN, part of the VIN, or a combination thereof. Appearance characteristics generated by this invention can be integrated into such coating database and can be associated with the coating formulas, so that color and appearance data of the target coating can be used to select one or more formulas that match both color and appearance.

It is understood by those skilled in the art that color data and appearance data of the target coating must be in compatible forms with color characteristics and appearance characteristics stored in the coating database. For example, if the color data of the target coating are L*,a*,b* data, then the color characteristics stored in the coating database must be compatible with L*,a*,b* data; and if the appearance data of the target coating are from a fixed illumination angle with multiple intensities, appearance characteristics stored in the coating database should also be of same or compatible data. It is also understood by those skilled in the art that some data forms may be converted or interchanged, such as that spectral reflectance data can be converted to L*,a*,b* data. The coating database can be constructed in such a way that color and/or appearance characteristics of multiple data formats are associated with each stored coating formula so color data or appearance data can be automatically compared to compatible characteristics in the database.

Once one or more matching formulas are selected, match coating compositions can be prepared according to the matching formulas for producing coatings matching the color and the appearance of the target coating. If the match coating is not completely satisfactory in color or appearance, those skilled in the art may further adjust formula by modifying amounts of one or more components in the formula.

This invention is further directed to a system for identifying one or more matching formulas for matching color and appearance of a target coating containing effect pigments.

One embodiment of such system comprises a color measurement device for obtaining color data of the target coating; an imaging device for obtaining target images of the target coating; an illumination device for providing illuminations at one or more pre-set illumination intensities to the target coating and to direct a reflection of said illuminations to the imaging device; a computing device comprising a processor and a memory member; a coating database containing coating formulas associated with color characteristics and appearance characteristics, wherein the coating database is accessible from the computing device; and a computing program product operatively residing in the memory member that causes the computing device to perform a computing process comprising the steps of:
  a. receiving the color data and the target images of said target coating;
  b. measuring characteristics of said target coating from said target images to generate appearance data;
  c. comparing said color data and said appearance data to color characteristics and appearance characteristics stored in the coating database; and
  d. selecting from the coating database, one or more said matching formulas, wherein said matching formulas have color characteristics that match the color data and appearance characteristics that match the appearance data.

Another embodiment of such system comprises a color measurement device for obtaining color data of the target coating; an appearance measurement device for obtaining appearance data of said target coating, said appearance device may further comprise an illumination device for providing illuminations at one or more pre-set illumination intensities to the target coating and to direct a reflection of said illuminations to an appearance measurement element of said imaging device; a computing device comprising a processor and a memory member; a coating database containing coating formulas associated with color characteristics and appearance characteristics, wherein the coating database is accessible from the computing device; and a computing program product operatively residing in the memory member that causes the computing device to perform a computing process comprising the steps of:
  a. receiving the color data and appearance data of said target coating;
  b. comparing said color data and said appearance data to color characteristics and appearance characteristics stored in the coating database; and
  c. selecting from the coating database, one or more said matching formulas, wherein said matching formulas have color characteristics that match the color data and appearance characteristics that match the appearance data.

Some or all of aforementioned imaging devices can be modified or reconfigured by those skilled in the art to detect light reflection and record appearance data. The imaging devices can also be used in combination with one or more computing devices to measure and record appearance data. The imaging devices can also have a built-in computing device unit capable of processing and recording appearance data without transferring images to a separate computing device.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Measurement of Appearance

Target images were captured using an imaging device TM-7EX from Jai Pulnix of San Jose, Calif., USA. Illumination angle was set at 0° normal to the surface of the target coating and an effective illumination intensity was selected so flakes in the target coating show varying brightness. The imaging device used herein stores digital images with image intensity levels ranging from 0 to 255. This range comes from the 8 bits data format used to represent the data of any one pixel in a digital image. Illumination intensity setting is selected so that the brightest parts of the image are at or close to image intensity level 255 while at the same time objects at lower image intensities are still visible in the image. A coating database comprises individual images of alternate coatings wherein the images of alternate coatings were captured using the same illumination conditions.

Three different threshold levels were set for measuring appearance characteristics from captured images: T1 being the highest, T2 being the intermediate and T3 representing the background. For the measurement described in this example, following threshold levels were set as:

T1=225,

T2=150, and

T3=100.

The following features were then extracted from each of the images using a computer program product. For each image, pixels of entire image were measured. For statistic purposes, more than one image can be measured. Some data shown in the example represent average values of the measurements from more than one image. The images were captured at same or different portions of the target or alternate coatings. Based on predetermined sizes described below, features were categorized into different categories, such as small, medium, large and extra large. It is understood that those skilled in the art may choose different sizes for some or all the features as determined appropriate.

1) At Threshold Level T1:

No. of Object: Total number of distinct and contiguous sparkle objects with image intensity equal or greater than the T1 threshold.

No. of Sm: Average number of small sparkle objects measured in each of the images. A small sparkle object is defined as an object having at least one dimension in a range of 10-20 micrometers. Objects smaller than 10 micrometers were ignored in this particular measurement.

No. of Med: Average number of medium sparkle objects measured in each of the images. A medium sparkle object is defined as an object having at least one dimension in a range of 20-30 micrometers.

No. of Lg: Average number of large sparkle objects measured in each of the images. A large sparkle object is defined as an object having at least one dimension in a range of 30-50 micrometers.

No. of ExLg: Average number of extra large sparkle objects measured in each of the images. An extra large sparkle object is defined as an object having at least one dimension larger than 50 micrometers.

Area T1: Fractional area of the image having image intensities above the threshold level T1. An average value was given for each coating based on measurements of multiple images of that coating.

Measurement data are shown in Table 1.

TABLE 1

Measurement Data at T1 Threshold Level.

| Coatings | No. of Objects | No. of Sm | No. of Med | No. of Lg | No. of ExLg | Area T1 |
|---|---|---|---|---|---|---|
| Target | 226 | 37.4 | 45.6 | 15.2 | 4.4 | 0.5 |
| Alt A | 229 | 44.6 | 37.2 | 16.8 | 10.8 | 0.57 |
| Alt B | 131 | 23 | 20.2 | 9.2 | 4.6 | 0.3 |
| Alt C | 126 | 24.8 | 21.8 | 2.8 | 0.8 | 0.18 |
| Alt D | 313 | 68.4 | 51.8 | 9.2 | 2.2 | 0.5 |
| Alt E | 66 | 15.2 | 8 | 3.2 | 1.6 | 0.12 |
| Alt F | 287 | 56.8 | 43 | 19 | 6.4 | 0.59 |
| Alt G | 108 | 18 | 16.4 | 6.2 | 2.4 | 0.29 |

2) At Threshold Level T2:

No. of Exp: Average number of sparkle objects in the four aforementioned categories, namely small, medium, large and extra large as described above, where the size of the sparkle object is expanded at the Threshold Level T2 comparing to that at the Threshold Level T1. An average value was given for each coating based on measurements of multiple images of that coating (Table 2).

No. of New: Average number of new sparkle objects in the four aforementioned categories wherein a new sparkle object is a contiguous area that is distinct from any sparkle objects detected at the Threshold Level T1. An average value was given for each coating based on measurements of multiple images of that coating (Table 2).

Area Exp: Fractional area of the image having sparkle objects expanded at the Threshold Level T2 comparing to that at the Threshold Level T1. An average value was given for each coating based on measurements of multiple images of that coating (Table 3).

Area New: Fractional area of the image having new sparkle objects at the Threshold Level T2. An average value was given for each coating based on measurements of multiple images of that coating (Table 3).

Area Hi: A sum of Area Exp and Are New described above (Table 3).

3) At Threshold Level T3:

Area Mid: Fractional area of the image having image intensities between the threshold levels T2 and T3. An average value was given for each coating based on measurements of multiple images of that coating.

Area Lo: Fractional area of the image having image intensities below the threshold level T3. An average value was given for each coating based on measurements of multiple images of that coating.

TABLE 2

Feature Values at T2 Threshold Level

| | No. of Expanded Objects at T2 Threshold Level | | | | No. of New Objects at T2 Threshold Level | | | | |
|---|---|---|---|---|---|---|---|---|---|
| Coatings | No. of Sm | No. of Med | No. of Lg | No. of ExLg | No. of Objs | No. of Sm | No. of Med | No. of Lg | No. of ExLg |
| Target | 0.2 | 65.4 | 68.2 | 39.6 | 693 | 127 | 57.2 | 6.4 | 0.4 |
| Alt A | 0.2 | 62 | 56.6 | 49.8 | 773 | 128 | 76.8 | 7.4 | 0 |
| Alt B | 0.2 | 30.6 | 39.2 | 29.8 | 588 | 107 | 65 | 7.8 | 1.6 |
| Alt C | 0.2 | 45.8 | 34.4 | 12.2 | 638 | 127 | 66.6 | 7.8 | 0.8 |
| Alt D | 0.6 | 98.8 | 81.2 | 46.8 | 1236 | 230 | 137 | 12 | 1.8 |
| Alt E | 0.2 | 20 | 16.2 | 14.6 | 446 | 86.4 | 50 | 6.2 | 0.2 |
| Alt F | 0 | 92.4 | 73.4 | 53.4 | 1000 | 195 | 92 | 5 | 0.2 |
| Alt G | 0 | 18.6 | 32.6 | 30.2 | 595 | 111 | 71.4 | 13.4 | 3 |

TABLE 3

Feature Values at T2 and T3 Threshold Levels.

| Coatings | Area Exp | Area New | Area Hi | Area Mid | Area Lo |
|---|---|---|---|---|---|
| Target | 1.44 | 0.62 | 2.1 | 62.3 | 35.6 |
| Alt A | 1.61 | 0.74 | 2.3 | 61.3 | 36.3 |
| Alt B | 0.96 | 0.64 | 1.6 | 63.2 | 35.2 |
| Alt C | 0.67 | 0.67 | 1.3 | 62.3 | 36.3 |
| Alt D | 1.83 | 1.28 | 3.1 | 61.7 | 35.2 |
| Alt E | 0.44 | 0.5 | 0.9 | 64.5 | 34.6 |
| Alt F | 1.81 | 0.9 | 2.7 | 60.6 | 36.7 |
| Alt G | 0.85 | 0.73 | 1.6 | 66.3 | 32.1 |

Appearance data of the target coating comprise the measurement data of the target coating generated at the 3 threshold levels and are shown in Tables 1, 2 and 3. Appearance characteristics stored in the coating database comprise the measurement data of the alternate coatings generated at the 3 threshold levels are also shown in Tables 1, 2 and 3.

Measurement and Comparison of Color

Color measurement on the target coating and the alternate coatings mentioned above was done using a goniospectrophotometer Model MA6811, manufactured by X-Rite, Grandville, Mich. A spectrophotometer, such as Model SP64, manufactured by X-Rite, Grandville, Mich., can also be used.

Total color difference $\Delta E$ between the target coating and each of the alternate coatings was calculated and shown in Table 4.

TABLE 4

Total Color Difference.

| Coatings | $\Delta E$ |
|---|---|
| Target | — |
| Alt A | 1.90 |
| Alt B | 1.68 |
| Alt C | 1.63 |
| Alt D | 1.76 |
| Alt E | 0.97 |
| Alt F | 1.51 |
| Alt G | 1.67 |

Comparison of Appearance Data

Appearance data including appearance features of the target coating were compared to the appearance features of the alternate coatings by calculating and comparing corresponding feature values.

First, individual ratio of feature values Area Exp/Area T1 and Area New/Area T1 were calculated using the equations below.

$$R_{EA} = \text{Area Exp/Area } T1$$

$$R_{NA} = \text{Area New/Area } T1$$

Wherein corresponding feature values Area T1 are shown in Table 1, and Area Exp and Area New are shown in Table 3.

Then, individual feature distances $R_{EA\text{-}Alt} - R_{EA\text{-}Tgt}$, $R_{NA\text{-}Alt} - R_{NA\text{-}Tgt}$ and a root mean square (RMS) of the feature distances were calculated using the equation below:

$$RMS = (((R_{EA\text{-}Alt} - R_{EA\text{-}Tgt})^2 + (R_{NA\text{-}Alt} - R_{NA\text{-}Tgt})^2)/2)^{1/2}$$

Wherein:

$R_{EA\text{-}Alt}$ is an $R_{EA}$ value of an alternate coating;

$R_{EA\text{-}Tgt}$ is the $R_{EA}$ value of the target coating;

$R_{NA\text{-}Alt}$ is an $R_{EN}$ value of an alternate coating;

$R_{NA\text{-}Tgt}$ is an $R_{EN}$ value of the target coating.

It is to be noted that only two ratios were shown in this example for calculating feature distances and sum of the feature distances. Additional features, feature values, or feature distances can be used as determined necessary by those skilled in the art. It is also understood that different weighing factors may be given to one or more features, feature values or feature distances to generate weighed sum of feature distances.

Calculation results of the feature distances RMS are shown in Table 5.

TABLE 5

RMS of Feature Distances.

| Coatings | Area Exp/ Area T1 | Area New/ Area T1 | RMS of Feature Distance from the Target Coating |
|---|---|---|---|
| Target | 2.88 | 1.24 | — |
| Alt A | 2.82 | 1.30 | 0.06 |
| Alt B | 3.20 | 2.13 | 0.67 |
| Alt C | 3.72 | 3.72 | 1.85 |
| Alt D | 3.66 | 2.56 | 1.08 |
| Alt E | 3.67 | 4.17 | 2.14 |
| Alt F | 3.07 | 1.53 | 0.24 |
| Alt G | 2.93 | 2.52 | 0.90 |

Based on RMS results shown in Table 5, the following initial appearance ranking for the alternate coatings was generated (Table 6).

TABLE 6

Initial Appearance Ranking List.

| Alternate Coatings | Appearance Ranking |
|---|---|
| Alt A | 1 |
| Alt F | 2 |
| Alt B | 3 |
| Alt G | 4 |
| Alt D | 5 |
| Alt C | 6 |
| Alt E | 7 |

Additional feature values were then considered for top ranked alternate coatings. Differences of the numbers of extra large sparkle objects (No. of ExLg column in Table 1) were compared. Based on the data in Table 1, it was determined that the highest ranked Alt A coating has too many extra large sparkle objects that may result in a coarser coating compared to the target coating. The alternate coating Alt F was then moved up in ranking list. This process was repeated for each of the top alternate coatings to generate a refined appearance ranking. A formula selection was produced based on balanced considerations on both color and appearance rankings: Alt F was the best match, Alt B and Alt A were also satisfactory for matching both color and appearance of the target coating within acceptable tolerance. Final formula selection is shown in Table 7.

TABLE 7

Formula Selection Results.

| Alternate Coating Formulas | ΔE | Initial Appearance Ranking | Refined Appearance Ranking | Match Formula | Comments |
|---|---|---|---|---|---|
| Target | — | — | — | — | — |
| Alt F | 1.51 | 2 | 1 | Yes | Best Match |
| Alt A | 1.90 | 1 | 2 | Yes | 2$^{nd}$ Choice |
| Alt B | 1.68 | 3 | 3 | Yes | 2$^{nd}$ Choice |
| Alt G | 1.67 | 4 | — | No | |
| Alt D | 1.76 | 5 | — | No | |
| Alt C | 1.63 | 6 | — | No | |
| Alt E | 0.97 | 7 | — | No | |

What is claimed is:

1. A method for identifying one or more matching formulas for matching color and appearance of a target coating containing effect pigments, said method comprising the steps of:
   a) obtaining color data of the target coating;
   b) obtaining appearance data of the target coating;
   c) comparing the color data and the appearance data to color characteristics and appearance characteristics stored in a coating database by calculating color difference between said color data and said color characteristics, and feature distances between said appearance data and said appearance characteristics; and
   d) selecting from the coating database, one or more said matching formulas, wherein said matching formulas have color characteristics that match the color data and appearance characteristics that match the appearance data;
   wherein said matching formulas are selected by selecting and ranking alternate coatings from said coating database based on the color difference, ranking said alternate coatings based on the feature distances to produce an initial appearance ranking list, adjusting said initial appearance ranking list based on said appearance data to generate a refined appearance ranking list, and selecting said matching formulas based on top ranked coatings in said refined appearance ranking list.

2. The method of claim 1, wherein the color data comprise spectral reflectance data.

3. The method of claim 1, wherein the color data comprise a color identification code selected from a color code of a vehicle, a vehicle identification number (VIN) of the vehicle, a part of the VIN, or a combination thereof.

4. The method of claim 1, wherein the effect pigments are gonioapparent flakes.

5. The method of claim 1, wherein the target coating is affixed to surface of an automotive body.

6. A method for identifying one or more matching formulas for matching color and appearance of a target coating containing effect pigments, said method comprising the steps of:
   a) obtaining color data of the target coating using a color measurement device;
   b) obtaining one or more target images of the target coating at one or more pre-set illumination intensities using an imaging device;
   c) measuring characteristics of said target coating from said target images to generate appearance data;
   d) comparing the color data and the appearance data to color characteristics and appearance characteristics stored in a coating database by calculating color difference between said color data and said color characteristics, and feature distances between said appearance data and said appearance characteristics; and
   e) selecting from the coating database, one or more said matching formulas, wherein said matching formulas have color characteristics that match the color data and appearance characteristics that match the appearance data;
   wherein said matching formulas are selected by selecting and ranking alternate coatings from said coatings database based on the color difference, ranking said alternate coatings based on the feature distances to produce an initial appearance ranking list adjusting said initial appearance ranking list based on said appearance data to generate a refined appearance ranking list, and selecting said matching formulas based on top ranked coatings in said refined appearance ranking list.

7. The method of claim 6, wherein the step b) comprises:
   i) sequentially providing illuminations to the target coating at at least two said preset illumination intensities;
   ii) directing a reflection of each of said illuminations from said target coating to the imaging device to sequentially capture one or more target images of said target coating.

8. The method of claim 6, wherein the step b) comprises:
   i) providing illuminations to the target coating at a fixed illumination angle and at said pre-set illumination intensities;
   ii) selecting an effective illumination of an effective intensity under which the effect pigments of the target coating exhibit varying brightness;
   iii) directing a reflection of said effective illumination from the target coating to the imaging device to capture at least one image of the target coating.

9. The method of claim 6, wherein the step b) comprises:
   i) sequentially providing illuminations to the target coating at two or more illumination angles and at said one or more preset intensities;
   ii) directing a reflection of each of said illuminations from said target coating to the imaging device to sequentially capture one or more target images of said target coating.

10. The method of any one of claims 6-9, wherein the color measurement device is a colorimeter, spectrophotometer, or a goniospectrophotometer.

11. The method of any one of claims 6-9, wherein the color data comprise spectral reflectance data.

12. The method of any one of claims 6-9, wherein the color data comprise a color identification code selected from a color code of a vehicle, a vehicle identification number (VIN) of the vehicle, a part of the VIN, or a combination thereof.

13. The method of any one of claims 6-9, wherein the imaging device is a digital imager.

14. The method of any one of claims 6-9, wherein the effect pigments are gonioapparent flakes.

15. The method of any one of claims 6-9, wherein the target coating is affixed to surface or an automotive body.

16. The method of any one of claims 6-9, wherein the color measurement device and the imaging device are configured to obtain said color data and said target images from a same portion of the target coating simultaneously or sequentially.

17. The method of any one of claims 6-9, wherein the color measurement device and the imaging device are configured to obtain said color data and said target images from different portions of the target coating simultaneously or sequentially.

18. The method of claim 6, wherein said step c) comprising the step of obtaining a fractional area of each of the target images having image intensities above a first threshold level (Area T1), a fractional area of said each of the target images having sparkle objects expanded at a second threshold level (Area Exp), and a fractional area of said each of the target images having new sparkle objects at said second threshold level (Area New); and wherein said initial appearance ranking list is produced based on at least ratios of (Area Exp)/(Area T1) and (Area New)/(Area T1).

19. A system for identifying one or more matching formulas for matching color and appearance of a target coating containing effect pigments, said system comprising;
   a) a color measurement device for obtaining color data of the target coating;
   b) an appearance measurement device for obtaining appearance data of the target coating;
   c) a computing device comprising a processor and a memory member;
   d) a coating database containing coating formulas associated with color characteristics and appearance characteristics, wherein the coating database is accessible from the computing device; and
   e) a computing program product operatively residing in the memory member that causes the computing device to perform a computing process comprising the steps of
      i) receiving the color data and the appearance data of said target coating;
      ii) comparing said color data and said appearance data to color characteristics and appearance characteristics stored in the coating database by calculating color difference between said color data and said color characteristics, and feature distances between said appearance data and said appearance characteristics; and
      iii) selecting from the coating database, one or more said matching formulas, wherein said matching formulas have color characteristics that match the color data and appearance characteristics that match the appearance data;
      wherein said matching formulas are selected by selecting and ranking alternate coatings from said coating database based on the color difference, ranking said alternate coatings based on the feature distances to produce an initial appearance ranking list, adjusting said initial appearance ranking list based on said appearance data to generate a refined appearance ranking list, and selecting said matching formulas based on top ranked coatings in said refined appearance ranking list.

20. The system of claim 19, wherein the color measurement device is a colorimeter, spectrophotometer, or a goniospectrophotometer.

21. The system of claim 19, wherein the color data comprise spectral reflectance data.

22. The system of claim 19, wherein the color data comprise a color identification code selected from a color code of a vehicle, a vehicle identification number (VIN) of the vehicle, a part of the VIN, or a combination thereof.

23. The system of claim 19, wherein the appearance measurement device is a digital imager.

24. The system of claim 19, wherein the effect pigments are gonioapparent flakes.

25. The system of claim 19, wherein the target coating is affixed to surface of an automotive body.

26. A system for identifying one or more matching formulas for matching color and appearance of a target coating containing effect pigments, said system comprising:
   a) a color measurement device for obtaining color data of the target coating;
   b) an imaging device for obtaining target images of the target coating at said pre-set illumination intensities;
   c) an illumination device to provide illuminations at one or more pre-set illumination intensities to the target coating and to direct a reflection of said illuminations to the imaging device;
   d) a computing device comprising a processor and a memory member;
   e) a coating database containing coating formulas associated with color characteristics and appearance characteristics, wherein the coating database is accessible from the computing device; and
   f) a computing program product operatively residing in the memory member that causes the computing device to perform a computing process comprising the steps of;
      i) receiving the color data and the target images of said target coating;
      ii) measuring characteristics of said target coating from said target images to generate appearance data;
      iii) comparing said color data and said appearance data to color characteristics and appearance characteristics stored in the coating database by calculating color difference between said color data and said color characteristics, and feature distances between said appearance data and said appearance characteristics; and
      iv) selecting from the coating database, one or more said matching formulas, wherein said matching formulas have color characteristics that match the color data and appearance characteristics that match the appearance data;
      wherein said matching formulas are selected by selecting and ranking alternate coatings from said coating database based on the color difference, ranking said alternate coatings based on the feature distances to produce an initial appearance ranking list, adjusting said initial appearance ranking list based on said appearance data to generate a refined appearance ranking list, and selecting said matching formulas based on top ranked coatings in said refined appearance ranking list.

27. The system of claim 26, wherein the color measurement device is a colorimeter, spectrophotometer, or a goniospectrophotometer.

28. The system of claim 26, wherein the color data comprise a color identification code selected from a color code of a vehicle, a vehicle identification number (VIN) of the vehicle, a part of the VIN, or a combination thereof.

29. The system of claim 26, wherein the imaging device is a digital imager.

30. The system of claim 26, wherein the effect pigments are gonioapparent flakes.

31. The system of claim 26, wherein the illumination device comprises means for modulating illumination intensity.

32. The system of claim 26 wherein the illumination device comprises means for modulating illumination angle.

33. The system of claim 26, wherein the color measurement device comprises means for modulating illumination angles.

34. The system of claim 26, wherein the color measurement device comprises means for modulating illumination intensity.

35. The system of claim 26 further comprising a second database for storing and retrieving said color data and said appearance data, wherein the second database is accessible from the computing device.

36. The system of claim 26, wherein the color measurement device is operatively coupled to the computing device via wired or wireless connections.

37. The system of claim 26, wherein the imaging device is operatively coupled to the computing device via wired or wireless connections.

38. The system of claim 26, wherein the color measurement device and the imaging device are configured in one housing unit.

39. The system of claim 26, wherein the color measurement device and the imaging device are configured in separate housing units.

40. The system of claim 26, wherein the color measurement device and the imaging device are configured to obtain said color data and said target images from a same portion of the target coating simultaneously or sequentially.

41. The system of claim 26, wherein the color measurement device and the imaging device are configured to obtain said color data and said target images from different portions of the target coating simultaneously or sequentially.

42. The system of claim 26, wherein the computing device is a portable computing device.

43. The system of claim 42, wherein the portable computing device is operatively coupled to the color measurement device or the imaging device via wireless connections.

44. The system of claim 26, wherein the target coating is affixed to surface of an automotive body.

45. The system of claim 26, wherein said step ii) comprising the step of obtaining a fractional area of at least one of the target images having image intensities above a first threshold level (Area T1), a fractional area of said one of the target images having sparkle objects expanded at a second threshold level (Area Exp), and a fractional area of said one of the target images having new sparkle objects at said second threshold level (Area New); and wherein said initial appearance ranking list is produced based on at least ratios of (Area Exp)/(Area T1) and (Area New)/(Area T1).

* * * * *